United States Patent [19]

Iyengar et al.

[11] 3,869,902

[45] Mar. 11, 1975

[54] SMOOTH TAPE FORMATION OF TUBES

[75] Inventors: Rama Iyengar, Dorval; Bretislav Paul Zuber, Montreal; Jean Raymond Boucher, Chateauguay Center, Quebec, all of Canada

[73] Assignee: Northern Electric Company Limited, Montreal, Quebec, Canada

[22] Filed: Mar. 29, 1973

[21] Appl. No.: 346,031

Related U.S. Application Data

[62] Division of Ser. No. 52,434, July 6, 1970, Pat. No. 3,738,141.

[52] U.S. Cl. ............................ 72/52, 72/177, 72/368
[51] Int. Cl. ............................................ B21d 39/02
[58] Field of Search ................ 72/52, 177, 176, 368

[56] References Cited
UNITED STATES PATENTS

| 2,700,408 | 1/1955 | Babbitt | 72/368 |
| 2,764,214 | 9/1956 | Reynolds | 72/176 |

*Primary Examiner*—C. W. Lanham
*Assistant Examiner*—Robert M. Rogers

[57] ABSTRACT

A method and of forming a tube from a continuous tape of form retaining material, in which a tape is moved longitudinally in a straight path from a flat to a transversely circular configuration and after the lateral edges of the tape have substantially closed the resulting tube is stressed in substantially inverse proportion to the stress imparted to the tape in forming the tube.

10 Claims, 9 Drawing Figures

SMOOTH TAPE FORMATION OF TUBES

This is a division, of application Ser. No. 52,434 filed July 6, 1970 now U.S. Pat. No. 3,738,141.

The present invention relates to the production of tubes using continuous tapes, such as the formation of a tubular sheath about a cable core in the production of an electric cable.

The continuous formation of tubes from flat tapes is method of forming a continuous tape into a tube production of electric cables. Various types of apparatus are used to form such tubes and these fall mainly into three categories, namely moving belts, rollers and stationary troughs, over which the tape continuously travels. Apparatus using stationary troughs are known as smooth tape formers. In all of these methods a flat metal tape is axially aligned contiguous with s cable core and laterally curved to form a continuous annular cylinder about the core. A major problem arises in using this method, in that if the transition of the tape from a planar to an annular configuration takes place over a short length of travel kinks appear along the tube because of the differential strain, imparted to the tape transversely of its center line, above its elastic limit. In other words, in the formation of the tube the lateral edges of the tape have to travel farther than the centre portion of the tape and this stretches the tape edges. The presence of kinks in the tube is undesirable because the tube tends to jam when subsequently passing through a sheath extruder head to apply a further outer coating to the cable and it also prevents the formation of an effective seal between the overlapping edges of the tape forming the tube. Different types of apparatus have been devised to overcome this problem of kinking but they suffer from the disadvantages that they are (1) expensive to construct because they require either a contoured die or roller bearings and (2) expensive to maintain because of the problem of frictional drag of the tape which both reduces the efficiency of the operation and significantly increases the wear of the apparatus.

It is an object of the present invention to provide an improved method and apparatus for forming a continuous tape into a tube.

It is a further object of the invention to provide an improved method and apparatus for forming a tubular sheath about a cable core.

Another object of the invention is to provide an improved overlapping die for use with a smooth tape tube forming apparatus.

An example embodiment of the invention is shown in the accompanying drawings in which.

Figure 1:
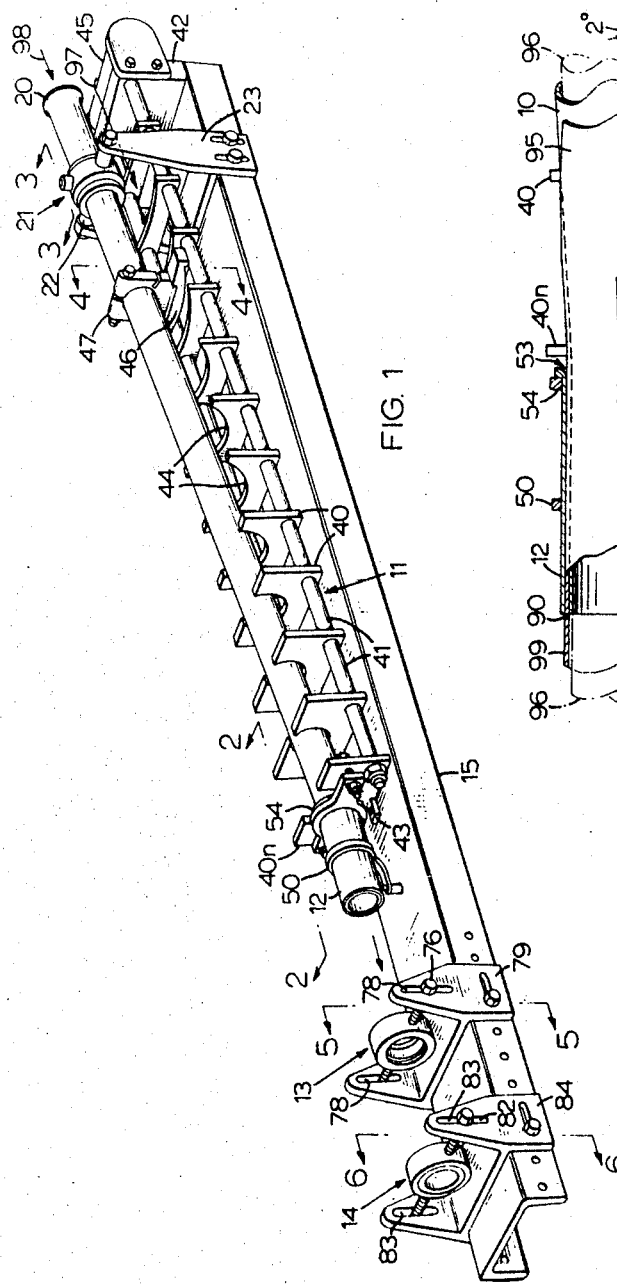
FIG. 1 is a perspective view of a tube forming apparatus.

As seen in FIG. 1 of the drawings, the example embodiment of the invention comprises a tubular mandrel 10 located above a forming trough 11, a bending or forming ring 12 located at the end of the forming trough and receiving the end of the mandrel, an overlapping die assembly 13 spaced from the forming ring, and a sizing or finishing die assembly 14 spaced from the overlapping die assembly, all these units being mounted on a fixed frame or base 15.

Figure 3:
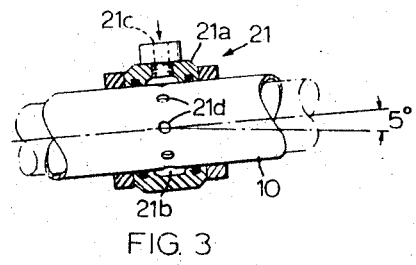
FIG. 3 is a view taken along the line 3—3 of FIG. 1, showing the core flooding collar in cross-section.

Tubular mandrel 10 has a flared inlet 20 and is supported by a flooding collar 21 (see FIG. 3) mounted adjacent the inlet on a pair of trunnions 22 interconnected with base 15 by a pair of fixed brackets 23 upstanding from the base. Flooding collar 21 comprises a ring 21a defining an annular passage 21b, an inlet port 21c and spaced ports 21d in mandrel 10 opening from the annular passage of the collar into the central passage of the mandrel. Adjacent its outlet end, mandrel 10 is machined and bent to form an annular knee 30 facing downwardly towards base 15.

Figure 4:
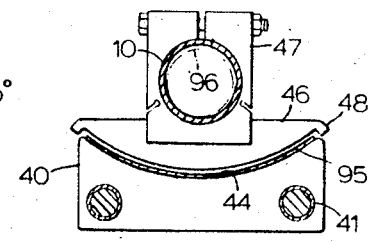
FIG. 4 is a cross-section, taken along the line 4—4 of FIG. 1, showing the retaining shoe.

Forming trough 11 comprises a series of spaced, parallel plate segments 40 fixed in a row on a pair of supporting rods 41. Rods 41 are fixed at one end to a supporting block 42 mounted on base 15 adjacent inlet 20 of mandrel 10 while the trough is supported at its other end by the last segment 40n which rests on base 15 and is held in position by centering key 43 fixed to the base. Each plate segment 40 is cut away at its upper edge to form an arcuate recess 44 to be described below. A flat apron 45 is fixed on block 42 below inlet 20 of mandrel 10 and in line with trough 11. A retaining shoe 46 (see FIG. 4) is suspended above trough 11 by a bracket 47 clamped on mandrel 10, and terminates laterally in overhanging stops 48.

Forming ring 12 is a short cylinder located concentrically about the end of mandrel 10 beyond knee 30 and beyond pipe segment 40n. Ring 12 is supported in position by a first collar 50 which is mounted on base 15 by a rod 51 riding on a floating tension spring 52 adapted to urge collar 50 downwardly and prevent chattering of the apparatus when in operation. The end of forming ring 12 adjacent pipe segment 40n is flared outwardly to form an inlet 53 and the ring is held in position adjacent inlet 53 by a second collar 54 which is bolted on the plate segment.

Figure 5:
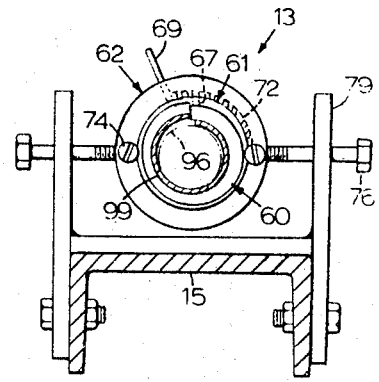
FIG. 5 is a cross-section, taken along the line 5—5 of FIG. 1, showing the overlapping die assembly.
Figure 7:
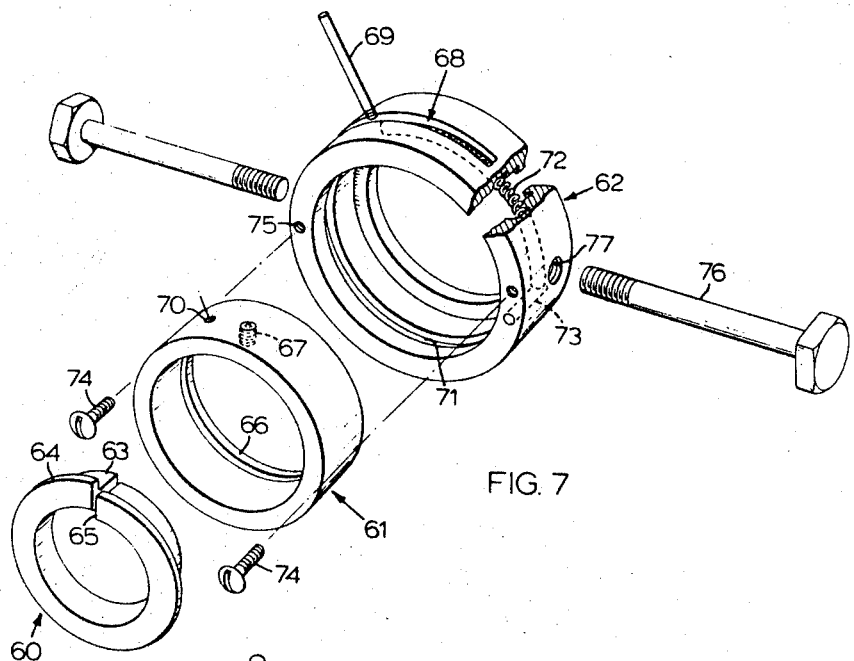
FIG. 7 is an exploded view in perspective of the overlapping die shown in FIGS. 1 and 6.

Overlapping die assembly, as seen more particularly in FIGS. 5 and 7 of the drawings, comprises an annular die 60 which fits into an annular die retainer 61 which in turn fits into an annular die casing 62. Die 60 comprises a ring 63 having a flange 64 along one edge. The inner surface of ring 63 is slightly conical and the ring is split to form two abutting surfaces offset one from another, one of the abutting surfaces forming a step 65 on the inner surface of the ring. Die retainer 61 has a circumferential, inwardly projecting ring 66 at one edge to act as a stop for ring 63 when die 60 is inserted into the retainer, die retainer 61 also carries a screw 67 set into the outer circumferential surface of the retainer and projecting inwardly from its inner circumferential surface to bear against ring 63 for adjusting the depth of step 65 in die 60. Die casing 62 carries a slot 68 lying in the circumference of the casing and a handle 69, engaging a threaded hole 70 in the outer wall of die retainer 61, projects through the slot. A circumferential groove 71 on the inner surface of die casing 62 carries a compression spring 72 which bears at one end laterally against handle 69 at the other end against a transverse pin 73 mounted in the wall of the casing. A pair of screws 74 are threaded into holes 75 in the edge of casing 62 and the heads of the screws hold die retainer 61 within the casing. Die assembly 13 is mounted on base 15 of the apparatus by a pair of bolts 76 which are threaded transversely into holes 77 in the wall of casing 62 and are engaged in slots 78 in a pair of brackets 79 fixed to base 15. Set screw 67 is located in die retainer 61 to be accessible through slot 68 in die casing 62.

Figure 6:
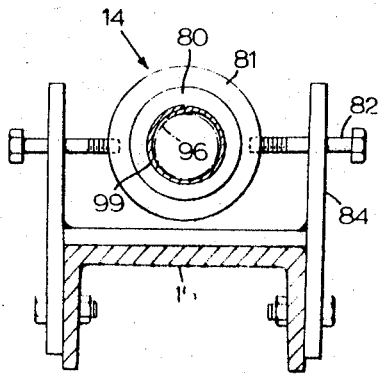
FIG. 6 is a cross-section, taken along the line 6—6 of FIG. 1, showing the sizing and die assembly.

Sizing or finishing die 14, as shown more particularly in FIG. 6 of the drawings, consists of an inner die ring 80 fitted into a die casing 81 which is mounted on base 15 in a manner similar to the mounting of overlapping die assembly 13, i.e. by a pair of threaded bolts 82 projecting radially from die casing 81 and being engaged in slots 83 in a pair of brackets 84 fixed on the base.

Figure 2:
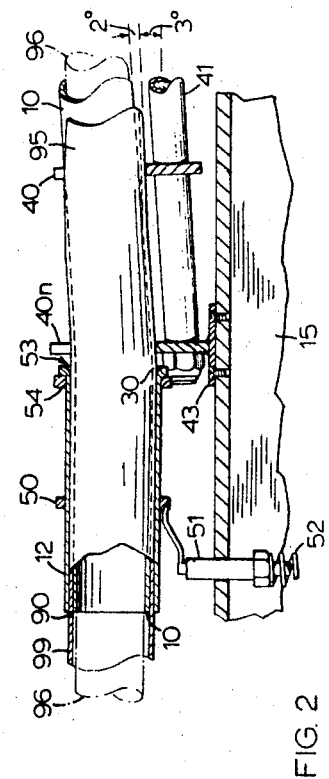
FIG. 2 is a cross-section, taken along the line 2—2 of FIG. 1, of that portion of the apparatus including the forming tube.

The construction of trough 11 and its relationship with mandrel 10 and forming ring 12 will now be described. Recesses 44 in plate segments 40 are configured to provide a trough outlining the natural contour which a continuous tape of given width would assume as it is formed linearly from a flat tape into an annular tube. To achieve this, the arcuate recess 44 in each plate segments 40 of trough 11 is configured to the cross-sectional shape of the adjacent tape at that point in the straight line course of the tape from apron 45 to forming ring 12. The cross-sectional configuration of the tape at any given point along its formative path is actually parabolic but an adequate approximation to the contour can be obtained by providing a recess 44 which is circular in its central portion and tangential at each end. The straight centre-line of the trough meets the lowermost longitudinal line of the inner surface of forming ring 12, preferably at an angle of 2°, as seen in FIG. 2.

As already explained, mandrel 10 is machined adjacent one end to lie, beyond knee 30, co-axially within forming ring 12. The outer diameter of mandrel 10 is smaller than the inner diameter of forming ring 12 to provide an annular space 90 between the ring and the mandrel sufficient for free passage of a tube formed from a tape. The angle formed at knee 30 of mandrel 10 is preferably 5°, giving an angle of 3° between the mandrel and trough 11.

Figure 8:
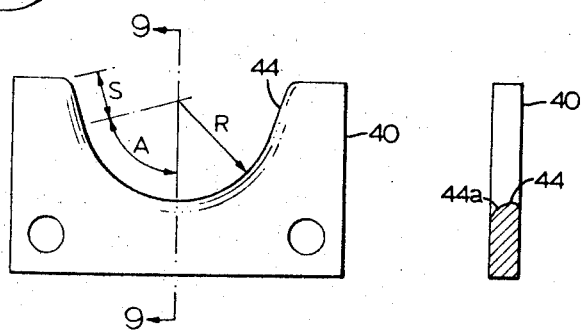
FIG. 8 is a front elevation of one plate segment of the forming trough.

The preferred length of forming trough 11 is approximately 9 times the width of the tape to be formed into a tube. To construct trough 11, sufficient plate segments 40 should be used to prevent too great a gap between segments which tends to re-open the tape and increase the friction between the tape and the segments. Referring to FIG. 8 of the drawings, the following table gives the values of the arc A from the center-line of the trough, and the radius R, for each recess 44 to form a tube using a tape of 1 inch width:

TABLE 1

| Plate | Arc A | Radius R |
| --- | --- | --- |
| P1 | 5°30' | 4.2737 |
| P2 | 12°30' | 1.8947 |
| P3 | 20°20' | 1.1710 |
| P4 | 29°30' | .8084 |
| P5 | 40°0' | .5958 |

TABLE 1-Continued

| Plate | Arc A | Radius R |
| --- | --- | --- |
| P6 | 52°0' | .4579 |
| P7 | 63°50' | .3724 |
| P8 | 79°50' | .2981 |
| P9 | 97°10' | .2444 |
| P10 | 114°40' | .2074 |
| P11 | 131°30' | .1813 |

Figure 9:
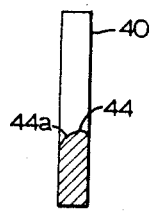
FIG. 9 is a view in cross-section taken along the line 9—9 of FIG. 8.

For other widths of tape, the value of R in the table should be multiplied by the width of the tape, while the value of arc A remains the same. The remaining length S adjoining the outer end of the arc is a straight line tangential to the arc at its end point, and provides the extra length to accomodate the width of the tape. Length S in inches is calculated from the following equation:

$$s = \frac{1}{2}(1 - R\alpha) + 3/32$$

where $\alpha$ is the value of arc A in radius. For a tape 95 of 1 inch width, $S = 0.3865$ inches for all segments 40. The leading edge 44a of recess 44 (i.e. that edge facing towards apron 45) should have a large bevel as seen in FIG. 9 of the drawings.

In the operation of the apparatus, a continuous tape 95, such as aluminum, is fed over apron 45 into trough 11, in the direction of arrow 97, from a reel (not shown) while at the same time a core 96 such as a multiple strand conductor cable, is fed through inlet 20 into mandrel 10, in the direction of arrow 98, from another reel (not shown). As tape 95 travels in a straight line along trough 11 any tendency for the tape to lift from the trough "wall" (i.e. recesses 44) will be prevented by retaining shoe 46 which also helps to centre the tape in the trough by means of lateral stops 48. After tape 95 travels through trough 11 it enters annular space 90 between the inner surface of forming ring 12 and the outer surfaces of mandrel 10 located within the forming ring. As it enters forming ring 12, tape 95 is almost closed upon itself to form a tube 99 with a small longitudinal gap. Tube 99 passes, in the region of the centre line of tape 95, over knee 30 of mandrel 10, which causes the central region of the tape to travel slightly farther than the lateral edge regions of the tape. The stress on any point of tube 99 as it travels over knee 30 is inversely proportional to the lateral distance of that point from the centre line of tape 95 and produces a strain in the tube which is greatest at the centre line of the tape and reduces to zero at its lateral edges. Since this variation in strain across tube 99 is opposite to that produced during the passage of tape 95 through trough 11, it equalizes the strain across the tube and eliminates the kinks which would otherwise be formed along the seam of the tube.

When tube 99, formed from tape 95, emerges from forming ring 12 it circumscribes core 96 which is emerging from mandrel 10 at the same rate of speed, with a small longitudinal gap. Tube 99 next passes through overlapping die 60 where one edge of the tube abuts step 65 of the die and, because of the constricted diameter of the die passage, the other edge of the tube slides under the edge abutting the step, as seen in FIG. 5 of the drawings. Because the exact location of the edge of tube 99 varies, step 65 of overlapping die 60 is continuously urged against it by compression spring 72 which bears against handle 69 to rotate die 61. Die assembly 13 floats freely by reason of its mounting through bolts 76 on brackets 79, which prevents further stresses from impinging on tube 99.

After tube 99 (with core 96) emerges from overlapping die 13 it passes through sizing die 14 to give the tube its final diameter, as shown in FIG. 6 of the drawings. Sizing die is free floating in the same manner as overlapping die 13, and for the same purpose. When tube 99 and cable 96 emerge from sizing die 14 the cable is in its final form and ready for jacketing or other finishing operations.

If the core of the cable is to be filled with an insulating material such a polystyrene, the filler may be introduced in liquid form through flooding collar 21 by way of inlet port 21c, passage 21b and ports 21d.

It will be seen that the apparatus of the invention compensates for the original strain imparted adjacent the lateral edges of tape 95 during tube formation by poststressing tube 99 in inverse proportion, around its circumference, to the original stress. Forming trough 11 provides a path for a predetermined angle of approach of tape 95 to knee 30 of mandrel 10 and the natural contour of the path frees tape 95 from lateral restraints, other than stops 48 of shoe 46, which reduces the drag on the tape, reduces wear of the apparatus, and allows some variation in the width of the tape used to form tube 99 (for example an apparatus designed to form a tube from 3 inch tape will take tape of a width 3 inch ±¼ inch). For further improvement in wear, recesses 44 in plate segments 40 may be lightly lubricated. While the main function of mandrel 10 is to poststress tape 95 by means of knee 30, the mandrel also (1) presents a smooth surface to the upper face of the tape, a function not always performed by a cable core which is neither perfectly circular or smooth, (2) holds a core wrapped (for instance a non-hygroscopic tape) from unwrapping, without the need of a binder, until tube 99 can perform this function, and (3) provides an enclosure for flooding the gap between the cable core and the inside of the tube formed by the tape.

We claim:

1. A method of forming a tube from a continuous tape of form retaining material, comprising the steps of:
   1. continuously feeding the tape longitudinally in a straight, planar path and simultaneously applying deflecting pressure laterally to the longitudinal edge portions of the tape to deflect the tape from a flat configuration to a transversely circular configuration to form a tube; and
   2. stressing the tube longitudinally in substantially inverse proportion to the longitudinal stress imparted to the tape in forming the tube.

2. A method as claimed in claim 1 in which the tube is stressed by passing the tube over a knee within the tube to change the direction of said path in a plane passing through the longitudinal centre line of the tape and normal thereto.

3. A method as claimed in claim 2 in which the change in direction of said path is about 2°.

4. A method as claimed in claim 2 in which the change in direction of said path is angular.

5. A method as claimed in claim 2 in which the length of travel of the tape from a flat configuration to a transversely circular configuration is about 9 times the width of the tape and the change in direction of said path is about 2°.

6. A method as claimed in claim 1 in which the path of the tape is along a trough having the natural lateral contour of the tape being formed into the tube.

7. A method as claimed in claim 1 in which the tube is formed about a continuous core.

8. A method as claimed in claim 2 in which the tube is formed about an angled mandrel, the tube passing over the knee of the angled mandrel to change the direction of said path.

9. A method as claimed in claim 8 in which the angle between the tape and the mandrel is about 3°.

10. A method as claimed in claim 2 in which the longitudinal edges of the tube are overlapped to form an overlapping seam and the tube is stressed before said edges are overlapped.

* * * * *